(12) United States Patent
Kuroki et al.

(10) Patent No.: US 6,544,607 B1
(45) Date of Patent: Apr. 8, 2003

(54) PLASTICIZED POLYESTER COMPOSITIONS AND FILMS THEREFROM

(75) Inventors: Takayuki Kuroki, Aichi-ken (JP); Shuhei Ikado, Chiba-ken (JP); Masataka Iwata, Mie-ken (JP); Hirotaka Wanibe, Aichi-ken (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/498,341

(22) Filed: Feb. 4, 2000

(30) Foreign Application Priority Data

Feb. 18, 1999 (JP) .......................... 11-039449

(51) Int. Cl.$^7$ .................. C08K 5/103; C08L 67/02; C08L 67/04
(52) U.S. Cl. ............. 428/35.2; 426/415; 428/35.5; 428/913; 524/313
(58) Field of Search .............. 428/34.9, 35.2, 428/35.5; 524/313; 426/415

(56) References Cited

U.S. PATENT DOCUMENTS

| | | | |
|---|---|---|---|
| 5,462,983 A | * 10/1995 | Bloembergen et al. | 524/51 |
| 5,766,748 A | * 6/1998 | Ikado et al. | 428/220 |
| 5,824,398 A | * 10/1998 | Shis | 428/211 |
| 6,117,928 A | * 9/2000 | Hiltunen et al. | 524/284 |

FOREIGN PATENT DOCUMENTS

| | | |
|---|---|---|
| EP | 0 683 207 A2 | 11/1995 |
| EP | 0683207 A3 | 2/1996 |
| JP | 2269145 A | 11/1990 |
| JP | 03-277656 | 12/1991 |
| JP | 4335060 A | 11/1992 |
| JP | 6-240117 | 8/1994 |
| JP | 6340753 A | 12/1994 |
| JP | 7177826 A | 7/1995 |
| JP | 7257660 A | 10/1995 |
| JP | 8034913 A | 2/1996 |
| JP | 8245866 A | 9/1996 |
| JP | 9111107 A | 4/1997 |
| JP | 10-036650 | 2/1998 |
| JP | 10-195306 | 7/1998 |
| JP | 2000-026623 | 1/2000 |
| WO | WO 95/24447 | 9/1995 |

OTHER PUBLICATIONS

Hackh's Chemical Dictionary, 3$^{rd}$ Ed. (1944), pp. 332–333, and 382.*
K. Ishikawa et al; Kobunshi Ronbunshu, vol. 48, No. 4, 1991, pp. 221–226, XP000222964, *with English abstract—XP002171864*.

* cited by examiner

Primary Examiner—Sandra M. Nolan
(74) Attorney, Agent, or Firm—Burns, Doane, Swecker & Mathis, LLP

(57) ABSTRACT

An aliphatic polyester stretched film which has excellent flexibility and heat resistance and manifests no bleeding of a plasticizer, an aliphatic polyester composition which is a raw material of the stretched film, and a package using the stretched film. The film can be prepared from an aliphatic polyester composition comprising 10 to 60 parts by weight of at least one compound selected from (A) a compound represented by the general formula: $R_1OCH_2CH(OR_2)CH_2OR_3$ (wherein, at least one of $R_1$, $R_2$ and $R_3$ represents an acyl group having 6 to 18 carbon atoms, and remaining groups represent a hydrogen atom or an acetyl group.) and (B) a compound which is a reaction product of a condensate of 1 to 10 glycerin units with a carboxylic acid having 6 to 18 carbon atoms, based on 100 parts by weight of an aliphatic polyester. The aliphatic polyester stretched film can have a crystallinity of 20 to 60% which is obtained by molding the composition, and the film can be formed into a package obtained.

15 Claims, No Drawings

PLASTICIZED POLYESTER COMPOSITIONS AND FILMS THEREFROM

BACKGROUND OF THE INVENTION AND RELATED ART

1. Field of the Invention

The present invention relates to an aliphatic polyester stretched film, an aliphatic polyester composition which is a raw material of the stretched film, and a package using the stretched film. More particularly, the present invention relates to an aliphatic polyester stretched film which has degradability within a natural environment, has excellent flexibility and heat resistance and manifests no bleeding of a plasticizer, an aliphatic polyester composition which is a raw material of the stretched film, and a package using the stretched film.

2. Related Art of the Invention

Recently, treatment of plastic wastes have been featured. Plastic molded articles such as packing materials have been disposed by burning, land reclamation and the like after use thereof. However, when plastic wastes are burned, high combustion heat leads to a durability problem with the incinerator. Substances such as polyvinyl chloride sometimes generate harmful gases causing environmental pollution. Further, in the case of the land reclamation treatment, plastic molded products are not completely degraded and remain semi-permanent in original form, causing problems of influence on the natural environment.

Due to such conditions, various biodegradable plastics which are degraded completely by microorganisms within the natural environment and are degraded into natural by-products, carbonic acid gases, water and the like have been invented, and are used at a practical level. For example, Japanese Laid-Open Patent No. Hei-6-340753 discloses a resin composition mainly comprising polylactic acid which is an aliphatic polyester, or a lactic acid-other hydroxycarboxylic acid copolymer. It has been disclosed that this resin composition, for example, can be used as a raw material of a degradable card (sheet), and this card has a high mechanical strength and manifests practical durability, and the like. However, this resin composition has a high elastic modulus and rigidity, and poor flexibility. Therefore, this resin composition is not suitable for use that requires flexibility in which polyethylene, polypropylene, soft polyvinyl chloride and the like are generally used.

In general, there are known, as methods for softening a resin, (1) addition of a plasticizer, (2) copolymerization, (3) blend of a soft polymer, and the like. Among them, investigations for softening using various plasticizers have been made, as in method (1). For example, Japanese Laid-Open Patent No. Hei-4-335060 discloses a composition obtained by adding a plasticizer to polylactic acid. As specific plasticizers, diisobutyl adipate, dioctyl sebacate and the like are listed. However, these have a low plasticizing effect, and sufficient flexibility is not obtained. Further, when these plasticizers are used, bleeding of a plasticizer occurs directly after molding or over time causing variation in flexibility, transparency and the like.

Method (3) is limited to a method adopting a biodegradable resin having flexibility as a blend resin, if biodegradability is taken into consideration. Regarding a biodegradable resin having flexibility, for example, JP-A Nos. 8-245866 and 9-111107 disclose polybutylene succinate, polyethylene succinate, polycaprolactone and the like. However, for imparting sufficient flexibility (tensile modulus of 1.0 GPa or less) to lactic acid-based polymers, it is necessary that the above-described biodegradable resin is added in large amounts (for example, in the case of polybutylene succinate, 60 wt % or more). Consequently, heat resistance, transparency and the like which are characteristics of lactic acid-based polymers deteriorate.

The object of the present invention is, in view of the above-described problems, to provide an aliphatic polyester stretched film which has excellent flexibility, heat resistance and transparency and manifests no bleeding of a plasticizer, an aliphatic polyester composition which is a raw material of the stretched film, and a package using the stretched film.

SUMMARY OF THE INVENTION

The present inventors have carried out an intensive study to solve the above-described problems, and as a result, have found that an aliphatic polyester composition can be obtained which manifests suppressed bleeding of a plasticizer and is suitable as a raw material of molded products such as a film and the like having excellent transparency, heat resistance and flexibility, by selectively adding a specific plasticizer to an aliphatic polyester. Also, it has been found that an aliphatic polyester stretched film having flexibility can be obtained without decreasing transparency and heat resistance of the film due to bleeding of a plasticizer, by film-molding the above-described polyester composition and then stretching and heat setting the film to control the crystallinity in the specific range. Further, it has been found that this stretched film is suitable as a packing material for foods and the like.

Namely, the first invention of the present invention is an aliphatic polyester composition comprising 10 to 60 parts by weight of at least one compound selected from (A) a compound represented by the general formula (1)

(wherein, at least one of $R_1$, $R_2$ and $R_3$ represents an acyl group having 6 to 18 carbon atoms, and remaining groups represent a hydrogen atom or an acetyl group.) and (B) a compound which is a reaction product of a condensate of 1 to 10 glycerin molecules with a carboxylic acid having 6 to 18 carbon atoms, based on 100 parts by weight of an aliphatic polyester.

In this polyester composition, the aliphatic polyester is preferably a lactic acid-based polymer. As the lactic acid-based polymer, polylactic acid, lactic acid-other aliphatic hydroxycarboxylic acid copolymer, or a mixture thereof is preferable. It is preferable that the number of glycerin molecules of a glycerin condensate forming the compound (B) is from 2 to 10. Further, it is preferable that the compound (A) and the compound (B) are included in the composition, and the ratio by weight of (A):(B) is from 1:1 to 4:1.

The second invention is an aliphatic polyester stretched film having a crystallinity of 20 to 60% which is obtained by molding the above-described aliphatic polyester composition. The thickness of the stretched film is preferably from 5 to 1,000 μm.

The third invention is a package which is obtained by packing a product to be packed using the above-described aliphatic polyester stretched film.

The aliphatic polyester composition of the present invention has excellent flexibility, and in addition, is suitable as a raw material of a stretched film and the like in which a plasticizer does not bleed out onto the surface. The aliphatic polyester stretched film of the present invention has excellent heat resistance and flexibility, and further, manifests no bleeding out of a plasticizer. Further, when the aliphatic polyester is polylactic acid, a lactic acid-other aliphatic hydroxycarboxylic acid copolymer comprising 40 mol % or more of a lactic acid unit, or an aliphatic polyester comprising a polyfunctional polysaccharides and 50 mol % or more of a lactic acid unit, and an aliphatic polyester comprising an aliphatic polyvalent carboxylic acid unit, aliphatic polyvalent alcohol unit and a lactic acid unit, the stretched film has degradability within the natural environment and does not accumulate as industrial waste or household waste even if discarded after use.

Therefore, the stretched film can be suitably used as a material in a wide range such as various packing films for foods, electronic products, medical products, medicines, cosmetics and the like, agricultural films, building and contracting films, adhesive tapes and the like. In particular, the stretched film is suitable as a packing material for foods. When product to be packed in the package of the present invention is a food, composting treatment, for example, or the like is possible without separating the packing material from waste of the product to be packed.

DETAILED DESCRIPTION OF PREFERRED EMBODIMENTS

The present invention will be described in detail below. First, the aliphatic polyester composition of the present invention will be described. The aliphatic polyester composition of the present invention is produced by adding and mixing, as a plasticizer, at least one compound selected from the above-described compound (A) and compound (B) into an aliphatic polyester.

The aliphatic polyester used in the present invention is an aliphatic polyester comprising a lactic acid unit in the molecule. Specific examples thereof include (1) polylactic acid, and lactic acid-other aliphatic hydroxycarboxylic acid copolymers, (2) aliphatic polyesters comprising polyfunctional polysaccharides and a lactic acid unit, (3) aliphatic polyesters comprising an aliphatic polyvalent carboxylic acid unit, an aliphatic polyvalent alcohol unit and a lactic acid unit, and (4) mixtures thereof. Namely, examples thereof include the lactic acid-based polymers (1) to (4). Among them, polylactic acid, and lactic acid-other aliphatic hydroxycarboxylic acid copolymers are preferable when transparency, hydrolyzability and the like of the resulting stretched film are taken into consideration. Preferable still is polylactic acid.

Lactic acid includes a L-lactic acid and a D-lactic acid. When referred to simply as lactic acid in the present invention, both the L-lactic acid and D-lactic acid are indicated unless otherwise stated. The molecular weight of a polymer indicates the weight-average molecular weight unless otherwise stated. As the polylactic acid used in the present invention, there are listed poly (L-lactic acid) solely composed of L-lactic acid, poly (D-lactic acid) solely composed of D-lactic acid, poly (DL-lactic acid) comprising a L-lactic acid unit and a D-lactic acid unit in various proportions, and the like. As the hydroxycarboxylic acid of a lactic acid-other aliphatic hydroxycarboxylic acid copolymer, there are listed glycolic acid, 3-hydroxybutyric acid, 4-hydroxybutyric acid, 4-hydroxyvaleric acid, 5-hydroxyvaleric acid, 6-hydroxycaproic acid and the like.

As the method for producing polylactic acid used in the present invention, a method in which L-lactic acid, D-lactic acid or DL-lactic acid is directly dehydrated and polycondensed, a method in which a lactide, cyclic dimer of such lactic acid is ring opening-polymerized, and the like are listed. The ring opening polymerization may also be conducted in the presence of a compound having a hydroxyl group such as higher alcohol, hydroxycarboxylic acid and the like. The compound may be produced by any method. As the method for producing a lactic acid-other aliphatic hydroxycarboxylic acid copolymer, a method in which the above-described lactic acid and the above-described aliphatic hydroxycarboxylic acid are dehydrated and polycondensed, a method in which a lactide, cyclic dimer of the above-described lactic acid, and a cyclic body of the above-described hydroxycarboxylic acid are ring opening-copolymerized, and the like are listed. The copolymer may be produced by any method. The amount of a lactic acid unit contained in a lactic acid-other aliphatic hydroxycarboxylic acid copolymer is preferably at least 40 mol %.

Examples of polyfunctional polysaccharides used for producing an aliphatic polyester comprising polyfunctional polysaccharides and a lactic acid unit include cellulose, cellulose acetate, cellulose nitrate, methyl cellulose, ethyl cellulose, celluloid, viscose rayon, regenerated cellulose, cellophane, cupra, cupro-ammonium rayon, cuprofan, bemberg, hemicellulose, starch, acropectin, dextrin, dextran, glycogen, pectin, chitin, chitosan, gum arabic, cyamoposis gum, locust bean gum, acacia gum and the like, and mixtures, and derivatives. Among them, cellulose acetate and ethyl cellulose are preferable.

As the method for producing an aliphatic polyester comprising polyfunctional polysaccharides and a lactic acid unit, a method in which the above-described polysaccharides are reacted with the above-described polylactic acid, lactic acid-other aliphatic hydroxycarboxylic acid copolymer and the like, a method in which the above-described polysaccharides are reacted with the above-described lactic acid, cyclic esters and the like, as well as other methods are listed. The aliphatic polyester may be produced by any method. It is preferable that the amount of a lactic acid unit contained in the aliphatic polyester is at least 50 mol %.

Examples of the aliphatic polyvalent carboxylic acid used for producing an aliphatic polyvalent carboxylic acid unit, an aliphatic polyvalent alcohol unit and a lactic acid unit include oxalic acid, succinic acid, malonic acid, glutaric acid, adipic acid, pimelic acid, suberic acid, azelaic acid, undecanedioic acid, dodecanedioic acid and the like, and anhydrides thereof. These may be mixed with an acid anhydride. Examples of the aliphatic polyvalent alcohol include ethylene glycol, diethylene glycol, triethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol, tetramethylene glycol, 1,4-cyclohexanedimethanol and the like.

As the method for producing an aliphatic polyester comprising an aliphatic polyvalent carboxylic acid unit, an aliphatic polyvalent alcohol unit and a lactic acid unit, a method in which the above-described aliphatic polyvalent carboxylic acid and the above-described aliphatic polyvalent alcohol are reacted with the above-described polylactic acid, lactic acid-other aliphatic hydroxycarboxylic acid copolymer and the like, a method in which the above-described aliphatic polyvalent carboxylic acid and the above-described aliphatic polyvalent alcohol are reacted with the above-described polylactic acid, cyclic esters and the like, as well as other methods are listed. The aliphatic polyester may be produced by any method. It is preferable that the amount of a lactic acid unit contained in the aliphatic polyester is at least 50 mol %.

The molecular weight of the aliphatic polyester exerts an influence on processability into a film, and strength and degradability of the obtained film. When the molecular weight is low, strength of the obtained film decreases and the film may be broken in use. Further, degradation speed increases. On the other hand, when the molecular weight is high, processability lowers and film molding becomes difficult. From such a standpoint, the molecular weight of the aliphatic polyester is in a range from about 10,000 to about 1,000,000. A further preferable range is from 100,000 to 300,000.

In the present invention, there is used, as a plasticizer for the aliphatic polyester, at least one compound selected from (A) a compound represented by the above-described general formula (1) and (B) a compound which is a reaction product of a condensate of 1 to 10 glycerin molecules with a carboxylic acid having 6 to 18 carbon atoms. The additional amount of the plasticizer exerts an influence on crystallinity, flexibility, heat resistance and the like of the resultant stretched film. When the additional amount is too high, the crystallinity and heat resistance lower. When the additional amount is too low, sufficient flexibility is not obtained. From such a standpoint, it is preferable that the additional amount of the plasticizer is from 10 to 60 parts by weight based on 100 parts by weight of the aliphatic polyester. Preferably still, the additional amount is from 15 to 50 parts by weight.

The compound (A) used in the present invention is a glycerin ester represented by the general formula (1). In general, the amount of an acetyl group in this compound is 2 mol or less on average per 1 mol of glycerin. The amount of an acyl group having 6 to 18 carbon atoms (hereinafter, referred to as a C6 to C18 acyl group) is 0.9 mol or more on average per 1 mol of glycerin. The total amount of the acetyl group and C6 to C18 acyl group is in the range from 2.7 to 3.0 mol on average per 1 mol of glycerin. Preferably, the total amount of the acetyl group and C6 to C18 acyl group is in the range from 2.9 to 3.0 mol on average per 1 mol of glycerin. From the standpoints of the resin plasticizing effect, non-bleeding property and the like, acyl groups having 8 to 18 carbon atoms are preferable among the C6 to C18 acyl groups, in this glycerin ester.

Preferable still is an ester represented by the general formula (1) in which at least one of $R_1$, $R_2$ and $R_3$ represents an acyl group having 8 to 18 carbon atoms and remaining groups represent an acetyl group. As a particularly preferable compound (A), glycerin diacetomonocaprylate, glycerin diacetomonolaurate and glycerin diacetomonooleate are listed. The compound (A) may be used alone or in an admixture. As a typical commercially available product of the compound (A), Rikemal PL-004, PL-012, PL-014 [trade name, manufactured by Riken Vitamin K.K.] and the like are listed.

In the present invention, the compound (B) which is used as a plasticizer is usually a compound obtained by reacting 0.8 to 1.2 mol of a carboxylic acid having 6 to 18 carbon atoms with 1 mol of a condensate of 1 to 10 glycerin molecules. As a typical commercially available product thereof, Rikemal L-71-D, S-71-D, DL-100, A-3750 [trade name, manufactured by Riken Vitamin K.K.] and the like are listed. From the standpoints of the resin plasticizing effect, non-bleeding property and the like, an ester compound of a condensate of 2 to 10 glycerin molecules with a carboxylic acid having 8 to 18 carbon atoms is preferable. Preferable still is an ester of a condensate of 4 to 10 glycerin molecules with a carboxylic acid. As the particularly preferable specific compound, tetraglycerin caprylate, decaglycerin laurate and decaglycerin oleate are listed. The compound (B) may be used alone or in an admixture. As a typical commercially available product of the compound (B), Poem J-4081, J-6021, J-0021, J-0381 [trade name, manufactured by Riken Vitamin K.K.] and the like are listed.

In view of suppression of the bleeding of a plasticizer, it is preferable to use the compound (A) and the compound (B) together. In this case, it is preferable that the mixing ratio by weight of (A):(B) is in the range from 1:1 to 4:1. A further preferable mixing ratio by weight of (A):(B) is in the range from 2:1 to 3:1.

In the aliphatic polyester composition of the present invention, in addition to the main components, aliphatic polyester, compound (A) and compound (B), other additives such as an anti-blocking agent, lubricant, antistatic agent, anti-fogging agent, ultraviolet ray absorber, heat stabilizer, antioxidant, coloring inhibitor, filler, pigment, flame retardant and the like maybe added in the range wherein the object of the present invention can be accomplished.

As the anti-blocking agent, silica, calcium carbonate, titania, mica, talc and the like are listed. As the lubricant, hydrocarbons such as liquid paraffin, polyethylene wax and the like, fatty acids such as stearic acid and the like, oxyfatty acids, fatty amides, alkylene bisfatty amides, fatty acid lower alcohol esters, fatty acid polyvalent alcohol esters, fatty acid polyglycol esters, aliphatic alcohols, polyvalent alcohols, polyglycols, metal soaps such as calcium stearate and the like are listed.

As the antistatic agent, fatty acid salts, higher alcohol sulfuric acid esters, liquid fatty oil sulfuric acid ester salts, aliphatic amines and aliphatic amides sulfuric acid salts, aliphatic alcohol phosphoric acid ester salts, sulfonic acid salts of dibasic fatty acid esters, aliphatic amide sulfonic acid salts, alkylallylsulfonic acid salts, aliphatic amine salts, quaternary ammonium salts, alkylpyridium salts, polyoxyethylene alkyl ethers, polyoxyethylene alkylphenol ethers, polyoxyethylene alkyl esters, sorbitan alkyl esters, polyoxyethylene sorbitan alkyl esters, imidazoline derivatives, higher alkylamines and the like are listed.

As the anti-fogging agent, glycerin fatty esters such as glycerin monostearate and the like, sorbitan fatty esters such as sorbitan monolaurate, sorbitan monooleate and the like, polyglycerin fatty esters, propylene glycol fatty esters and the like are listed. As the ultraviolet ray absorber, benzotriazoles such as 2-(2'-hydroxy-5'-methylphenyl) benzotriazole and the like, benzophenones such as 2-hydroxy-4-methoxybenzophenone and the like, salicylic acid derivatives such as p-tert-butylphenyl salicylate and the like, are listed.

As a heat stabilizer, antioxidant and coloring inhibitor, phenol-based compounds such as p-methoxyphenol and the like, phosphite-based compounds such as triphenylphosphite and the like, sulfur-based compounds such as 2-mercaptobenzimidazole and the like, amine-based compounds such as phenylnaphthyleneamine and the like, are listed. As filler, barium sulfate, titanium oxide, kaolin, carbon black and the like are listed. As a flame retardant, halogen-based compounds such as decabromodiphenyl ether and the like, antimony-based compounds such as antimony trioxide and the like, are listed.

Next, the aliphatic polyester stretched film of the present invention and an example of a method for producing the same will be described. As the method for adding and mixing a plasticizer into an aliphatic polyester, there can be adopted a method in which the aliphatic polyester and plasticizer, and other optional additives are mixed uniformly using a high speed stirrer, low speed stirrer or the like, then the mixture is melted and kneaded using a single screw or multi-screw extruder having sufficient kneading ability, as well as other methods. The resin composition of the present invention is preferably in the form of a pellet, rod, powder and the like.

The resin composition obtained as described above is molded into a film by a melt extrusion method using an extruder equipped with a T die. The resulting film is stretched along the machine direction (hereinafter, referred to as longitudinal direction) by a roll stretching method, then, stretched along a direction vertical to the machine direction (hereinafter, referred to as transverse direction) by a tenter stretching method. After stretching, the film is heat-treated under tension to obtain an aliphatic polyester stretched film. This film can be produced also by a melt extrusion using an extruder equipped with a circular die, namely, a tubular molding method.

The melt extrusion temperature of the above-described aliphatic polyerster composition is in a range preferably from 100 to 280° C., and more preferably from 130 to 250° C. When the molding temperature is lower, molding stability cannot be obtained easily and an excess load tends to occur. On the other hand, when the molding temperature is higher, the aliphatic polyester may be degraded causing an undesirable decrease in molecular weight, a decrease in strength, coloring and the like.

The aliphatic polyester stretched film of the present invention is obtained by stretching along at least one direction of the longitudinal direction and transverse direction by 1.3 to 5 times, and preferably 1.5 to 5 times. Biaxial stretching along the longitudinal direction and transverse direction is preferable. When stretching magnification is less than 1.3 times, crystallization causing stability over time in dynamic physical property and dimension accuracy does not proceed easily. On the other hand, when stretching magnification is over 5 times, flexibility of a film decreases leading to an undesirable break in the film and the like in stretching.

The stretching temperature is preferably in a range from the glass transition temperature (Tg) of an aliphatic polyester to (Tg+50)°C. More preferably, it is in the range from Tg to (Tg+30)°C. When the stretching temperature is less than Tg, stretching is difficult, and when over (Tg+50)°C., uniform stretching is undesirably difficult. For improving heat resistance and dimension stability, heat setting is conducted under tension at a temperature of (Tg+10)°C. or more and less than the melting temperature after stretching. In this operation, the crystallinity of a film can be controlled by changing the stretching and heat setting conditions.

By conducting stretching and heat setting under the above-described conditions, a stretched film is obtained having a crystallinity of 20 to 60%. The preferable crystallinity is from 20 to 50%. For example, 20 parts by weight of glycerin diacetomonolaurate which is one of compound (A) is added to 100 parts by weight of an aliphatic polyester, the mixture is processed through a T die to form a film, then, the film is stretched along the longitudinal direction by 2.5 times and along the transverse direction by 2.5 times (hereinafter, abbreviated as 2.5×2.5) at 50° C. Then, the film is subjected to heat setting at 140° C. under tension to obtain a stretched film having a crystallinity of about 35%. Usually, in the case of an inflation molding method, a tubular (seamless) product is formed in the form of a wound product. The thickness of the aliphatic polyester stretched film of the present invention can be appropriately changed depending on use, and usually is in the range from 5 to 1000 μm.

Herein, the package of the present invention will be described. The package of the present invention is formed by packing a product to be packed using the above-described aliphatic polyester stretched film. The above-described aliphatic polyester stretched film may be cut in a given dimension and used as a cut sheet, or the above-described aliphatic polyester stretched film may be formed into a bag. In the case of a bag, it is preferable that a product to be packed is filled in a bag, then, the opening is sealed. As the sealing method, there are listed a heat seal method, high frequency seal method, adhesive tape fixing method, binding method using a cord, aluminum wire, copper wire and the like, as well as other methods. In addition, one surface at the opening part is made longer than the other surface, and the leading point is folded for sealing. When the product to be packed is a product to be discarded, a heat seal method, high frequency seal method, and fixing method using a degradable adhesive tape are preferable.

Usually, in the case of a cut sheet, a film in the form of a wound product is cut into a length of about 5 to 100 cm for use. In the case of a bag, a bag having a width of 5 to 100 cm and a depth of 5 to 100 cm is formed to be used. The filling amount of product to be packed is about 0.1 g to 10 kg.

As the method for forming an adhesive layer, there is, for example, a method in which application liquid containing an acrylic resin such as a copolymer obtained by copolymerizing an alkyl acrylate such as ethyl acrylate, butyl acrylate, 2-ethylhexyl acrylate and the like with other vinyl monomers is applied on a film and dried. The application liquid may be an organic solvent solution of the above-described copolymer or an aqueous emulsion.

The product to be packed is not particularly restricted. Usually, there are listed foods, pharmaceuticals, cosmetics, fertilizers, electronic and electric products and parts thereof, paper products, and wastes thereof and the like. Preferably, there are listed foods such as vegetables, fruits, fishery products, meats, cereals, dry goods, breads, dairy products, noodles, confections, edible wild plants, seasonings and the like, and waste thereof, and the like.

In the case of a bag, specific examples thereof include a food bag, shopping bag, trash bag, compost bag, soil bag and the like. In the case of a cut sheet, specific examples thereof include a food wrapping film, cosmetic wrapping film, pharmaceutical wrapping film, surgical application wrapping film, agricultural chemical wrapping film, wrapping film for electronic and electric products such as video, audio, and the like.

In addition, the film of the present invention can be used as an agricultural film for gardening plants and the like, a substrate film for a adhesive tape, a water-proof sheet and the like.

In the aliphatic polyester stretched film of the present invention, layers having functions such as antistatic property, anti-fogging property, adhesiveness, gas-barrier property, tight adhesion, easy adhesion and the like can be formed on the surface thereof, if necessary. As the method for forming these layers, an application method, laminate method and the like are listed. In the application method, for example, coating liquid containing an antistatic agent can be applied on one surface or both surfaces of a film and dried to form an antistatic layer. As the method for applying coating liquid, known methods can be used. That is, there can be used a spray coating method, air knife method, reverse coating method, kiss coating method, gravure coating method, meyer bar method, roll brush method and the like.

As the method for forming an adhesive layer, there is, for example, a method in which application liquid containing an acrylic resin such as a copolymer obtained by copolymerizing an alkyl acryalte such as ethyl acrylate, butyl acrylate, 2-ethylhexyl acrylate and the like with other vinyl monomers is applied on a film and dried. The application liquid may be an organic solvent solution of the above-described copolymer or an aqueous emulsion.

Further, in the aliphatic polyester stretched film of the present invention, layers having functions such as antistatic property, anti-fogging property, adhesiveness, gas-barrier property, tight adhesion, easy adhesion and the like can be formed by laminating other resin film, if necessary. As the lamination method, known methods such as an extrusion lamination method, dry lamination method and the like can be used.

EXAMPLE

The following examples further illustrate the present invention in detail below. Marks in Tables 1 through 4 have the following meanings and the carbon atom number in a bracket represents the number of carbon atoms of a carboxylic acid.

A1: glycerin diacetomonopropionate (carbon atom number: 3)
A2: glycerin diacetomonocaprylate (carbon atom number: 8)
A3: glycerin diacetomonolaurate (carbon atom number: 12)
A4: glycerin diacetomonooleate (carbon atom number: 18)
A5: glycerin diacetomonobehenate (carbon atom number: 22)
B1: decaglycerin propionate (carbon atom number: 3)
B2: tetraglycerin caprylate (carbon atom number: 8)
B3: decaglycerin laurate (carbon atom number: 12)
B4: decaglycerin oleate (carbon atom number: 18)
B5: decaglycerin behenate (carbon atom number: 22)

Evaluations of crystallinity, flexibility (elastic modulus), heat resistant temperature and bleeding shown in the following examples were conducted according to methods as described below.

(1) Crystallinity (%)

A differential scanning calorimeter [manufactured by Rigaku K. K., type: TAS100] was used, and the heat of fusion ($\Delta H$) was calculated from the peak area of the fusion curve. Then the crystallinity (Xc) was calculated from $\Delta H$ and the heat of fusion for complete crystal ($\Delta H_0$) according to the following numerical formula (numerical formula 1). Indium was used as a standard substance.

$$Xc = \Delta H / \Delta H_0 \quad \text{(numerical formula 1)}$$

(2) Flexibility (Elastic Modulus: GPa)

It was measured according to the method defined in JIS Z-6732.

(3) Heat Resistant Temperature (°C.)

A film having a machine direction size of 14 cm and a width direction size of 3 cm was laminated with flat grain paper having the same width and both 2.5 cm end parts along the machine direction of the film were adhered and fixed with the flat grain paper by an sticky tape to obtain a sample. The upper parts of respective 2.5 cm end parts of the sample film reinforced with the flat grain paper were fixed with jigs over a whole width, a load of 10 g was applied on the center part of the lower end, this sample was placed quickly into air controlled at constant temperature, and cutting of the sample after heating for 1 hour was checked. The test temperature was increased by 5° C. If the sample was not cut after 1 hour passed, the temperature was increased by 5° C., and the above-described operation was repeated. The maximum temperature at which the sample is not cut is the heat resistant temperature.

(4) Bleeding

A film having a machine direction size of 10 cm and a width direction size of 10 cm was left in an atmosphere of 60° C. and 50% RH, and bleeding of a plasticizer on the surface of the film was observed visually. The following judgements are made based on the number of days until bleeding is recognized. (⊚): 60 days or more, (○): 30 days or more and less than 60 days, (Δ): 14 days or more and less than 30 days, (X): less than 14 days.

Preparation Example 1

In a 100 liter reaction vessel equipped with a Dean-Stark trap, water was distilled while stirring 10 kg of 90 mol % L-lactic acid (impurity content: 0.5 mol %) at 150° C./50 mmHg for 3 hours, then, to this was added 6.2 g of tin powder, and the mixture was further stirred for 2 hours at 150° C./30 mmHg for oligomerization. To this oligomer was added 28.8 g of tin powder and 21.1 kg of diphenyl ether, and an azeotropic dehydration reaction was conducted at 150° C./35 mmHg, and distilled water and the solvent were separated by a water separator, and the aqueous layer was extracted sequentially and the solvent was individually returned to the reaction vessel. Two hours later (at this point, impurity content was 0.05 mol %), the organic solvent to be returned to the reaction vessel was returned to a reaction vessel through a column filled with a 4.6 kg molecular sieve 3A and the reaction was conducted at 150° C./35 mmHg to obtain a polylactic acid solution having a weight-average molecular weight of 120,000 in terms of polystyrene. To this solution was added 44 kg of dehydrated diphenyl ether for dilution, then, the mixture was cooled to 40° C., the precipitated crystal was filtered and washed with 10 kg of n-hexane three times and dried at 60° C./50 mmHg. To this powder was added 12 kg of 0.5 N hydrochloric acid and 12 kg of ethanol and the mixture was stirred for 1 hour at 35° C., then, filtered and dried at 60° C./50 mmHg to obtain 6.1 kg (yield: 85%) of a polylactic acid powder having an average particle size of 30 $\mu$m. This polymer had an average molecular weight of about 120,000 in terms of polystyrene.

Example 1

A pellet containing 10 parts by weight of a compound A [glycerin diacetomonooleate, manufactured by Riken Vitamin K.K., trade name: Poem G-048] and 10 parts by weight of a compound B [decaglycerin laurate, manufactured by Riken Vitamin K.K., trade name: Poem J-0021] based on 100 parts by weight of the polymer obtained in Preparation Example 1 was kneaded, melted and extruded using an extruder equipped with a T die at 180° C. to obtain a non-stretched film having a thickness of 60 $\mu$m. This non-stretched film was stretched along the longitudinal direction by 2 times, then, along the transverse direction by 3 times, and subjected to heat setting at 130° C., then, the film was cooled using air at 30° C. to obtain a stretched film having an average thickness of 11 $\mu$m. The resulting film had a crystallinity of 24%. The evaluation results are shown in Table 1.

Example 2

A pellet containing 10 parts by weight of a compound A [glycerin diacetomonooleate, manufactured by Riken Vitamin K.K., trade name: Poem G-048] and 5 parts by weight of a compound B [decaglycerin laurate, manufactured by Riken Vitamin K.K., trade name: Poem J-0021] based on 100 parts by weight of the polymer obtained in Preparation Example 1 was kneaded, melted and extruded using an extruder equipped with a T die at 180° C. to obtain a non-stretched film having a thickness of 60 μm. This non-stretched film was stretched along the longitudinal direction by 2 times, then, along the transverse direction by 2.5 times, and subjected to heat setting at 130° C., then, the film was cooled using air at 30° C. to obtain a stretched film having an average thickness of 12 μm. The resulting film had a crystallinity of 20%. The evaluation results are shown in Table 1.

Example 3

A pellet containing 30 parts by weight of a compound A [glycerin diacetomonolaurate, manufactured by Riken Vitamin K.K., trade name: Rikemal PL-002] and 10 parts by weight of a compound B [decaglycerin oleate, manufactured by Riken Vitamin K.K., trade name: Poem J-0381] based on 100 parts by weight of the polymer obtained in Preparation Example 1 was kneaded, melted and extruded using an extruder equipped with a T die at 180° C. to obtain a non-stretched film having a thickness of 80 μm. This non-stretched film was stretched along the longitudinal direction by 2.5 times, then, along the transverse direction by 3 times, and subjected to heat setting at 130° C., then, the film was cooled using air at 30° C. to obtain a stretched film having an average thickness of 12 μm. The resulting film had a crystallinity of 25%. The evaluation results are shown in Table 1.

Example 4

A pellet containing 40 parts by weight of a compound A [glycerin diacetomonolaurate, manufactured by Riken Vitamin K.K., trade name: Rikemal PL-002] and 10 parts by weight of a compound B [decaglycerin oleate, manufactured by Riken Vitamin K.K., trade name: Poem J-0381] based on 100 parts by weight of the polymer obtained in Preparation Example 1 was kneaded, melted and extruded using an extruder equipped with a T die at 180° C. to obtain a non-stretched film having a thickness of 140 μm. This non-stretched film was stretched along the longitudinal direction by 3.5 times, then, along the transverse direction by 4 times, and subjected to heat setting at 140° C., then, the film was cooled using air at 30° C. to obtain a stretched film having an average thickness of 10 μm. The resulting film had a crystallinity of 45%. The evaluation results are shown in Table 1.

Example 5

A pellet containing 15 parts by weight of a compound A [glycerin diacetomonocaprylate] based on 100 parts by weight of the polymer obtained in Preparation Example 1 was kneaded, melted and extruded using an extruder equipped with a T die at 180° C. to obtain a non-stretched film having a thickness of 60 μm. This non-stretched film was stretched along the longitudinal direction by 2 times, then, along the transverse direction by 3 times, and subjected to heat setting at 130° C., then, the film was cooled using air at 30° C. to obtain a stretched film having an average thickness of 10 μm. The resulting film had a crystallinity of 20%. The evaluation results of flexibility, heat resistant temperature and bleeding are shown in Table 1.

Example 6

A pellet containing 15 parts by weight of a compound A [glycerin diacetomonooleate, manufactured by Riken Vitamin K.K., trade name: Poem G-048] based on 100 parts by weight of the polymer obtained in Preparation Example 1 was kneaded, melted and extruded using an extruder equipped with a T die at 180° C. to obtain a non-stretched film having a thickness of 60 μm. This non-stretched film was stretched along the longitudinal direction by 2 times, then, along the transverse direction by 2.5 times, and subjected to heat setting at 130° C., then, the film was cooled using air at 30° C. to obtain a stretched film having an average thickness of 10 μm. The resulting film had a crystallinity of 23%. The evaluation results are shown in Table 1.

Example 7

A pellet containing 15 parts by weight of a compound B [tetraglycerin caprylate] based on 100 parts by weight of the polymer obtained in Preparation Example 1 was kneaded, melted and extruded using an extruder equipped with a T die at 180° C. to obtain a non-stretched film having a thickness of 60 μm. This non-stretched film was stretched along the longitudinal direction by 2 times, then, along the transverse direction by 3 times, and subjected to heat setting at 130° C., then, the film was cooled using air at 30° C. to obtain a stretched film having an average thickness of 10 μm. The resulting film had a crystallinity of 22%. The evaluation results are shown in Table 2.

Example 8

A pellet containing 15 parts by weight of a compound B [decaglycerin oleate, manufactured by Riken Vitamin K.K., trade name: Poem J-0381] based on 100 parts by weight of the polymer obtained in Preparation Example 1 was kneaded, melted and extruded using an extruder equipped with a T die at 180° C. to obtain a non-stretched film having a thickness of 60 μm. This non-stretched film was stretched along the longitudinal direction by 2 times, then, along the transverse direction by 3 times, and subjected to heat setting at 130° C., then, the film was cooled using air at 30° C. to obtain a stretched film having an average thickness of 10 μm. The resulting film had a crystallinity of 25%. The evaluation results are shown in Table 2.

Example 9

A pellet containing 30 parts by weight of a compound A [glycerin diacetomonooleate, manufactured by Riken Vitamin K.K., trade name: Poem G-048] based on 100 parts by weight of the polymer obtained in Preparation Example 1 was kneaded, melted and extruded using an extruder equipped with a T die at 180° C. to obtain a non-stretched film having a thickness of 60 μm. This non-stretched film was stretched along the longitudinal direction by 2 times, then, along the transverse direction by 2.5 times, and subjected to heat setting at 130° C., then, the film was cooled using air at 30° C. to obtain a stretched film having an average thickness of 10 μm. The resulting film had a crystallinity of 23%. The evaluation results are shown in Table 2.

Example 10

A pellet containing 30 parts by weight of a compound B [decaglycerin oleate, manufactured by Riken Vitamin K.K., trade name: Poem J-0381] based on 100 parts by weight of the polymer obtained in Preparation Example 1 was kneaded, melted and extruded using an extruder equipped with a T die at 180° C. to obtain a non-stretched film having a thickness of 60 μm. This non-stretched film was stretched along the longitudinal direction by 2 times, then, along the transverse direction by 3 times, and subjected to heat setting at 130° C., then, the film was cooled using air at 30° C. to obtain a stretched film having an average thickness of 10 μm. The resulting film had a crystallinity of 25%. The evaluation results are shown in Table 2.

Example 11

A pellet containing 30 parts by weight of a plasticizer [glycerin diacetomonooleate, manufactured by Riken Vitamin K.K., trade name: Poem G-048] based on 100 parts by weight of the polymer obtained in Preparation Example 1 was molded by a 40 mm inflation molding machine (die diameter: 40 mm) at 170° C. to obtain a tubular film having a folding diameter of 150 mm and a thickness of 10 μm. The resulting film was subjected to heat setting at 140° C., then, the film was cooled using air at 30° C. This film had a crystallinity of 24%. The evaluation results are shown in Table 2.

Example 12

A pellet containing 15 parts by weight of a compound A [glycerin diacetomonocaprylate] based on 100 parts by weight of the polymer obtained in Preparation Example 1 was kneaded, melted and extruded using an extruder equipped with a T die at 180° C. to obtain a non-stretched film having a thickness of 60 μm. This non-stretched film was stretched along the longitudinal direction by 1.3 times, then, along the transverse direction by 2.5 times, and subjected to heat setting at 130° C., then, the film was cooled using air at 30° C. to obtain a stretched film having an average thickness of 11 μm. The resulting film had a crystallinity of 20%. The evaluation results of flexibility, heat resistant temperature and bleeding are shown in Table 2.

Comparative Example 1

A pellet of the polymer obtained in Preparation Example 1 was kneaded, melted and extruded using an extruder equipped with a T die at 190° C. to obtain a non-stretched film having a thickness of 90 μm. This non-stretched film was stretched along the longitudinal direction by 2.5 times, then, along the transverse direction by 3.5 times, and subjected to heat setting at 140° C., then, the film was cooled using air at 30° C. to obtain a stretched film having an average thickness of 12 μm. The resulting film had a crystallinity of 45%. The evaluation results are shown in Table 3.

Comparative Example 2

A pellet containing 30 parts by weight of a plasticizer [glycerin triacetate] based on 100 parts by weight of the polymer obtained in Preparation Example 1 was kneaded, melted and extruded using an extruder equipped with a T die at 180° C. to obtain a non-stretched film having a thickness of 80 μm. This non-stretched film was stretched along the longitudinal direction by 2.5 times, then, along the transverse direction by 3.5 times, and subjected to heat setting at 130° C., then, the film was cooled using air at 30° C. to obtain a stretched film having an average thickness of 10 μm. The resulting film had a crystallinity of 43%. The evaluation results are shown in Table 3.

Comparative Example 3

A pellet containing 30 parts by weight of a plasticizer [tributyl acetylcitrate] based on 100 parts by weight of the polymer obtained in Preparation Example 1 was kneaded, melted and extruded using an extruder equipped with a T die at 180° C. to obtain a non-stretched film having a thickness of 60 μm. This non-stretched film was stretched along the longitudinal direction by 2 times, then, along the transverse direction by 2.5 times, and subjected to heat setting at 130° C., then, the film was cooled using air at 30° C. to obtain a stretched film having an average thickness of 11 μm. The resulting film had a crystallinity of 41%. The evaluation results are shown in Table 3.

Comparative Example 4

A pellet containing 15 parts by weight of a plasticizer [glycerin diacetomonopropionate] based on 100 parts by weight of the polymer obtained in Preparation Example 1 was kneaded, melted and extruded using an extruder equipped with a T die at 180° C. to obtain a non-stretched film having a thickness of 70 μm. This non-stretched film was stretched along the longitudinal direction by 2 times, then, along the transverse direction by 3 times, and subjected to heat setting at 130° C., then, the film was cooled using air at 30° C. to obtain a stretched film having an average thickness of 12 μm. The resulting film had a crystallinity of 25%. The evaluation results are shown in Table 3.

Comparative Example 5

A pellet containing 15 parts by weight of a plasticizer [decaglycerin propionate] based on 100 parts by weight of the polymer obtained in Preparation Example 1 was kneaded, melted and extruded using an extruder equipped with a T die at 180° C. to obtain a non-stretched film having a thickness of 80 μm. This non-stretched film was stretched along the longitudinal direction by 2.5 times, then, along the transverse direction by 3 times, and subjected to heat setting at 130° C., then, the film was cooled using air at 30° C. to obtain a stretched film having an average thickness of 10 μm. The resulting film had a crystallinity of 23%. The evaluation results are shown in Table 3.

Comparative Example 6

A pellet containing 15 parts by weight of a plasticizer [glycerin dibehenate] based on 100 parts by weight of the polymer obtained in Preparation Example 1 was kneaded, melted and extruded using an extruder equipped with a T die at 180° C. to obtain a non-stretched film having a thickness of 70 μm. This non-stretched film was stretched along the longitudinal direction by 2 times, then, along the transverse direction by 3 times, and subjected to heat setting at 130° C., then, the film was cooled using air at 30° C. to obtain a stretched film having an average thickness of 12 μm. The resulting film had a crystallinity of 27%. The evaluation results are shown in Table 3.

Comparative Example 7

A pellet containing 15 parts by weight of a plasticizer [decaglycerin behenate] based on 100 parts by weight of the polymer obtained in Preparation Example 1 was kneaded, melted and extruded using an extruder equipped with a T die at 180° C. to obtain a non-stretched film having a thickness of 80 μm. This non-stretched film was stretched along the longitudinal direction by 2.5 times, then, along the transverse direction by 3 times, and subjected to heat setting at 130° C., then, the film was cooled using air at 30° C. to obtain a stretched film having an average thickness of 10 μm. The resulting film had a crystallinity of 25%. The evaluation results are shown in Table 3.

Comparative Example 8

A pellet containing 70 parts by weight of a plasticizer [glycerin diacetomonooleate, manufactured by Riken Vitamin K.K., trade name: Poem G-048] based on 100 parts by weight of the polymer obtained in Preparation Example 1 was kneaded, melted and extruded using an extruder equipped with a T die at 180° C. to obtain a non-stretched film having a thickness of 70 μm. This non-stretched film was stretched along the longitudinal direction by 2 times, then, along the transverse direction by 3 times, and subjected to heat setting at 130° C., then, the film was cooled using air at 30° C. to obtain a stretched film having an average thickness of 12 μm. The resulting film had a crystallinity of 15%. The evaluation results are shown in Table 4.

Comparative Example 9

A pellet containing 5 parts by weight of a plasticizer [glycerin diacetomonolaurate, manufactured by Riken Vitamin K.K., trade name: Rikemal PL-012] based on 100 parts by weight of the polymer obtained in Preparation Example 1 was kneaded, melted and extruded using an extruder equipped with a T die at 180° C. to obtain a non-stretched film having a thickness of 60 μm. This non-stretched film was stretched along the longitudinal direction by 2 times, then, along the transverse direction by 2.5 times, and subjected to heat setting at 140° C., then, the film was cooled using air at 30° C. to obtain a stretched film having an average thickness of 11 μm. The resulting film had a crystallinity of 41%. The evaluation results are shown in Table 4.

Comparative Example 10

A pellet containing 90 parts by weight of a plasticizer [decaglycerin oleate, manufactured by Riken Vitamin K.K., trade name: Poem J-0381] based on 100 parts by weight of the polymer obtained in Preparation Example 1 was kneaded, melted and extruded using an extruder equipped with a T die at 180° C. to obtain a non-stretched film having a thickness of 80 μm. This non-stretched film was stretched along the longitudinal direction by 2.5 times, then, along the transverse direction by 3 times, and subjected to heat setting at 130° C., then, the film was cooled using air at 30° C. to obtain a stretched film having an average thickness of 10 μm. The resulting film had a crystallinity of 22%. The evaluation results are shown in Table 4.

Comparative Example 11

A pellet containing 5 parts by weight of a plasticizer [decaglycerin laurate, manufactured by Riken Vitamin K.K. trade name: Poem J-0021] based on 100 parts by weight of the polymer obtained in Preparation Example 1 was kneaded, melted and extruded using an extruder equipped with a T die at 180° C. to obtain a non-stretched film having a thickness of 80 μm. This non-stretched film was stretched along the longitudinal direction by 2.5 times, then, along the transverse direction by 3 times, and subjected to heat setting at 140° C., then, the film was cooled using air at 30° C. to obtain a stretched film having an average thickness of 11 μm. The resulting film had a crystallinity of 40%. The evaluation results are shown in Table 4.

Comparative Example 12

A pellet containing 35 parts by weight of a plasticizer [glycerin diacetomonooleate, manufactured by Riken Vitamin K.K., trade name: Poem G-048] and 35 parts by weight of a plasticizer [decaglycerin oleate, manufactured by Riken Vitamin K.K. trade name: Poem J-0381] based on 100 parts by weight of the polymer obtained in Preparation Example 1 was kneaded, melted and extruded using an extruder equipped with a T die at 180° C. to obtain a non-stretched film having a thickness of 80 μm. This non-stretched film was stretched along the longitudinal direction by 2.5 times, then, along the transverse direction by 3 times, and subjected to heat setting at 130° C., then, the film was cooled using air at 30° C. to obtain a stretched film having an average thickness of 10 μm. The resulting film had a crystallinity of 20%. The evaluation results are shown in Table 4.

Comparative Example 13

A pellet containing 30 parts by weight of a plasticizer [glycerin diacetomonooleate, manufactured by Riken Vitamin K.K., trade name: Poem G-048] based on 100 parts by weight of the polymer obtained in Preparation Example 1 was molded by a 40 mm inflation molding machine (dice diameter: 40 mm) at 170° C. to obtain a tubular film having a folding diameter of 150 mm and a thickness of 10 μm. The resulting film had a crystallinity of 3%. The evaluation results are shown in Table 4.

TABLE 1

| | | Example 1 | Example 2 | Example 3 | Example 4 | Example 5 | Example 6 |
|---|---|---|---|---|---|---|---|
| Compound A | Type | A4 | A4 | A3 | A3 | A2 | A4 |
| | Parts by weight | 10 | 10 | 30 | 40 | 15 | 15 |
| Compound B | Type | B3 | B3 | B4 | B4 | — | — |
| | Parts by weight | 10 | 5 | 10 | 10 | — | — |
| Film forming method | | T die extrusion →biaxial stretching →heat setting | T die extrusion →biaxial stretching →heat setting | T die extrusion →biaxial stretching →heat setting | T die extrusion →biaxial stretching →heat setting | T die extrusion →biaxial stretching →heat setting | T die extrusion →biaxial stretching →heat setting |
| Stretching magnification Longitudinal direction × transverse direction | | 2.0 × 3.0 | 2.0 × 2.5 | 2.5 × 3.0 | 3.5 × 4.0 | 2.0 × 3.0 | 2.0 × 2.5 |
| Heat setting temperature (° C.) | | 130 | 130 | 130 | 140 | 130 | 130 |
| Thickness (mm) | | 11 | 12 | 12 | 10 | 10 | 10 |
| Crystallinity (%) | | 24 | 20 | 25 | 45 | 20 | 23 |
| Flexibility Elastic modulus (GPa) | | 0.8 | 0.9 | 0.6 | 0.8 | 1.0 | 0.9 |
| Heat resistant temperature (° C.) | | 130 | 125 | 130 | 140 | 130 | 130 |
| Bleeding | | (◎) | (◎) | (◎) | (◎) | (○) | (○) |

TABLE 2

|  |  | Example 7 | Example 8 | Example 9 | Example 10 | Example 11 | Example 12 |
|---|---|---|---|---|---|---|---|
| Compound A | Type | — | — | A4 | — | A4 | A2 |
|  | Parts by weight | — | — | 30 | — | 30 | 15 |
| Compound B | Type | B2 | B4 | — | B4 | — | — |
|  | Parts by weight | 15 | 15 | — | 30 | — | — |
| Film forming method |  | T die extrusion →biaxial stretching →heat setting | T die extrusion →biaxial stretching →heat setting | T die extrusion →biaxial stretching →heat setting | T die extrusion →biaxial stretching →heat setting | Inflation →heat setting | T die extrusion →biaxial stretching →heat setting |
| Stretching magnification Longitudinal direction × transverse direction |  | 2.0 × 3.0 | 2.0 × 3.0 | 2.0 × 2.5 | 2.0 × 3.0 | 1.3 × 3.0 | 1.3 × 2.5 |
| Heat setting temperature (° C.) |  | 130 | 130 | 130 | 130 | 140 | 130 |
| Thickness (mm) |  | 10 | 10 | 10 | 10 | 10 | 11 |
| Crystallinity (%) |  | 22 | 25 | 23 | 25 | 24 | 20 |
| Flexibility Elastic modulus (GPa) |  | 1.0 | 0.9 | 0.7 | 0.7 | 0.7 | 0.7 |
| Heat resistant temperature (° C.) |  | 130 | 130 | 130 | 130 | 140 | 130 |
| Bleeding |  | (○) | (○) | (○) | (○) | (○) | (Δ) |

TABLE 3

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Plasticizer | Type | — | Glycerin triacetate | Tributyl acetylcitrate | A1 | B1 | A5 | B5 |
|  | Parts by weight |  | 30 | 30 | 15 | 15 | 15 | 15 |
| Film forming method |  | T die extrusion →biaxial stretching →heat setting | T die extrusion →biaxial stretching →heat setting | T die extrusion →biaxial stretching →heat setting | T die extrusion →biaxial stretching →heat setting | T die extrusion →biaxial stretching →heat setting | T die extrusion →biaxial stretching →heat setting | T die extrusion →biaxial stretching →heat setting |
| Stretching magnification Longitudinal direction × transverse direction |  | 2.5 × 3.5 | 2.5 × 3.5 | 2.0 × 2.5 | 2.0 × 3.0 | 2.5 × 3.0 | 2.0 × 3.0 | 2.5 × 3.0 |
| Heat setting temperature (° C.) |  | 140 | 130 | 130 | 130 | 130 | 130 | 130 |
| Thickness (mm) |  | 12 | 10 | 11 | 12 | 10 | 12 | 10 |
| Crystallinity (%) |  | 45 | 43 | 41 | 25 | 23 | 27 | 25 |
| Flexibility Elastic modulus (GPa) |  | 3.8 | 3.5 | 1.2 | 1.2 | 1.3 | 3.2 | 3.3 |
| Heat resistant temperature (° C.) |  | 140 | 130 | 130 | 130 | 130 | 140 | 140 |
| Bleeding |  | (○) | (○) | (x) | (x) | (x) | (○) | (○) |

TABLE 4

|  |  | Comparative Example 8 | Comparative Example 9 | Comparative Example 10 | Comparative Example 11 | Comparative Example 12 |  | Comparative Example 13 |
|---|---|---|---|---|---|---|---|---|
| Plasticizer | Type | A4 | A3 | B4 | B3 | A4 | B4 | A4 |
|  | Parts by weight | 70 | 5 | 90 | 5 | 35 | 35 | 30 |
| Film forming method |  | T die extrusion →biaxial stretching →heat setting | T die extrusion →biaxial stretching →heat setting | T die extrusion →biaxial stretching →heat setting | T die extrusion →biaxial stretching →heat setting | T die extrusion →biaxial stretching →heat setting |  | Inflation |
| Stretching magnification Longitudinal direction × transverse direction |  | 2.0 × 3.0 | 2.0 × 2.5 | 2.5 × 3.0 | 2.5 × 3.0 | 2.5 × 3.0 |  | 1.0 × 2.5 |
| Heat setting temperature (° C.) |  | 130 | 140 | 130 | 140 | 130 |  | — |
| Thickness (mm) |  | 12 | 11 | 10 | 11 | 10 |  | 10 |
| Crystallinity (%) |  | 15 | 41 | 22 | 40 | 20 |  | 3 |
| Flexibility Elastic modulus (GPa) |  | 0.5 | 3.2 | 0.6 | 3.2 | 0.6 |  | 0.6 |
| Heat resistant temperature (° C.) |  | 30 | 140 | 40 | 140 | 40 |  | 60 |
| Bleeding |  | (x) | (○) | (x) | (○) | (x) |  | (x) |

Example 13

The stretched film obtained in Example 3 was cut at a length of 180 mm and a width of 500 mm and folded along the width direction, then, two edges of side parts of the folder line were heat-sealed at 100° C. to obtain a bag having a width at an opening of 175 mm and a width of 250 mm. The resulting bag was filled with about 500 g of tomatoes, the opening of the bag was bound and fixed with a binding tape to obtain a food package.

Example 14

The tubular film having a folding diameter of 150 mm and a thickness of 11 μm obtained in Example 12 was melt-sealed at a melt sealing temperature of 280° C. at an interval of 250 mm along the longitudinal direction, then, cut at the same interval to obtain a bag having a width at an opening of 150 mm and a width of 245 mm. The resulting bag was filled with about 500 g of carrots, the opening of the bag was bound and fixed with a binding tape to obtain a food package.

What is claimed is:

1. An aliphatic polyester composition comprising 10 to 60 parts by weight of a mixture of (A) and (B), with (A) being compound represented by the general formula (1)

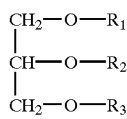

at least one of $R_1$, $R_2$ and $R_3$ represents an acyl group having 8 to 18 carbon atoms, and the remaining groups represent an acetyl group;

and B) being a compound which is a reaction product of a condensate of 2 to 10 glycerin units with a carboxylic acid having 6 to 18 carbon atoms, and the ratio of A:B is from 1:1 to 4:1, based on 100 parts by weight of an aliphatic polyester.

2. The aliphatic polyester composition according to claim 1 wherein the aliphatic polyester is a lactic acid-based polymer.

3. The aliphatic polyester composition according to claim 2 wherein the lactic acid-based polymer is at least one polyester selected from polylactic acid, and lactic acid-other aliphatic hydroxycarboxylic acid copolymer.

4. The aliphatic polyester composition according to claim 1 wherein the compound (A) is at least one compound selected from glycerin diacetomonocaprylate, glycerin diacetomonolaurate and glycerin diacetomonooleate.

5. The aliphatic polyester composition according to claim 1 wherein the compound (B) is an ester obtained by reacting 0.8 to 1.2 mol of a carboxylic acid with 1 mol of a glycerin condensate.

6. The aliphatic polyester composition according to claim 1 wherein the carboxylic acid forming the compound (B) has 8 to 18 carbon atoms.

7. The aliphatic polyester composition according to claim 1 wherein the glycerin condensate forming the compound (B) is composed of 4 to 10 glycerin units.

8. The aliphatic polyester composition according to claim 1 wherein the compound (B) is at least one compound selected from tetraglycerin caprylate, decaglycerin laurate and decaglycerin oleate.

9. The aliphatic polyester composition according to claim 1 wherein the total amount of the compound (A) and the compound (B) is from 15 to 50 parts by weight.

10. An aliphatic polyester stretched film having a crystallinity of 20 to 60% which is obtained by molding the aliphatic polyester composition of claim 1.

11. The aliphatic polyester stretched film according to claim 10 wherein the film is obtained by stretching along at least one direction by 1.5 to 5 times.

12. The aliphatic polyester stretched film according to claim 10 wherein the crystallinity is from 20 to 50%.

13. The aliphatic polyester stretched film according to claim 10 wherein the thickness of the film is from 5 to 1000 μm.

14. A package obtained by packing a product to be packed using the aliphatic polyester stretched film of claim 10.

15. The package according to claim 14 nwherein the product to be packed is a food.

* * * * *

UNITED STATES PATENT AND TRADEMARK OFFICE
CERTIFICATE OF CORRECTION

PATENT NO. : 6,544,607 B1  Page 1 of 1
DATED : April 8, 2001
INVENTOR(S) : Takayuki Kuroki et al.

It is certified that error appears in the above-identified patent and that said Letters Patent is hereby corrected as shown below:

Column 19,
Line 11, before "compound" insert -- a --.

Column 20,
Line 33, change "nwherein" to -- wherein --.

Signed and Sealed this

Second Day of December, 2003

JAMES E. ROGAN
*Director of the United States Patent and Trademark Office*